Dec. 23, 1924.

D. F. SHAFFER

SPEED REGISTER

Filed Nov. 2, 1923

Dewey F. Shaffer INVENTOR

BY Victor J. Evans ATTORNEY

Dec. 23, 1924.
D. F. SHAFFER
SPEED REGISTER
Filed Nov. 2, 1923 2 Sheets-Sheet 2
1,520,447
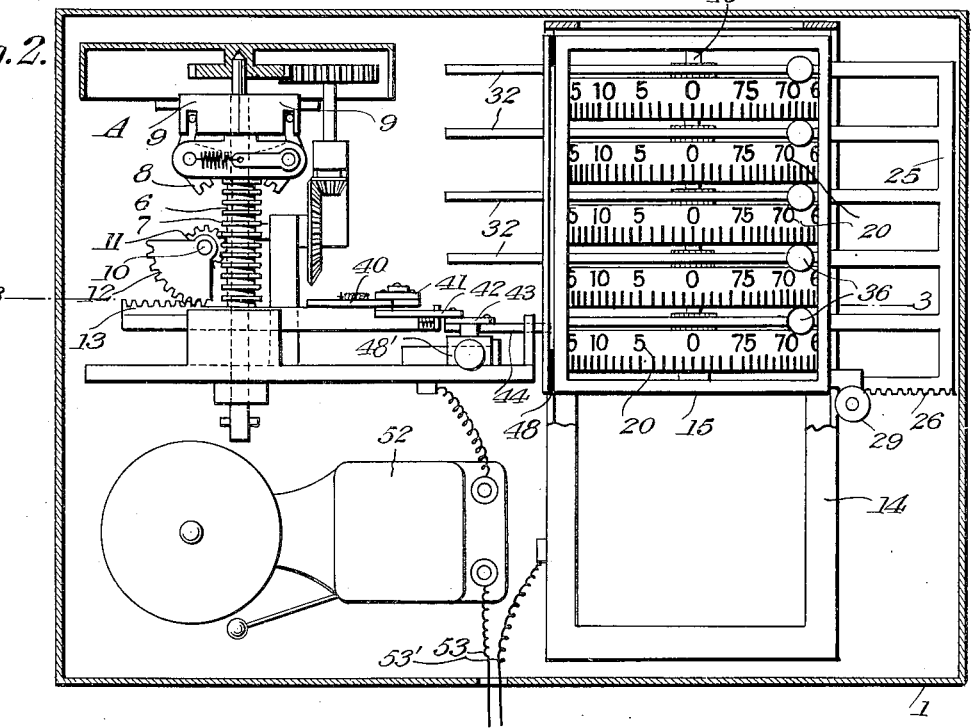
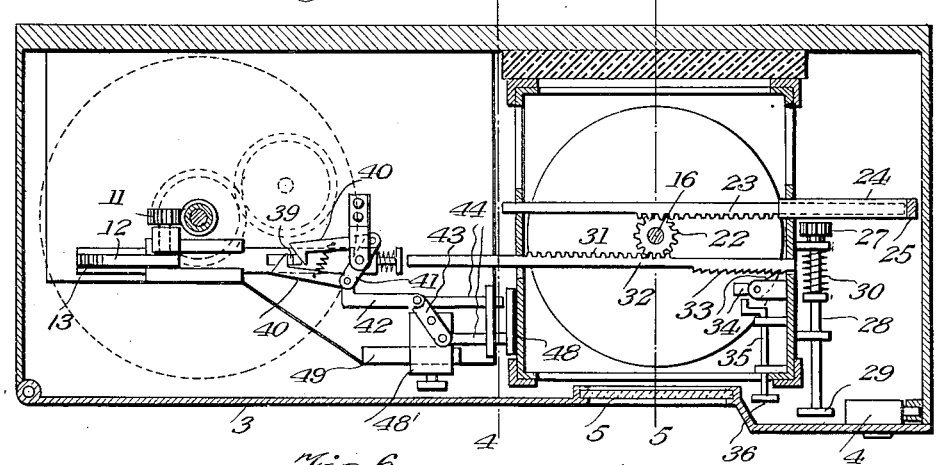
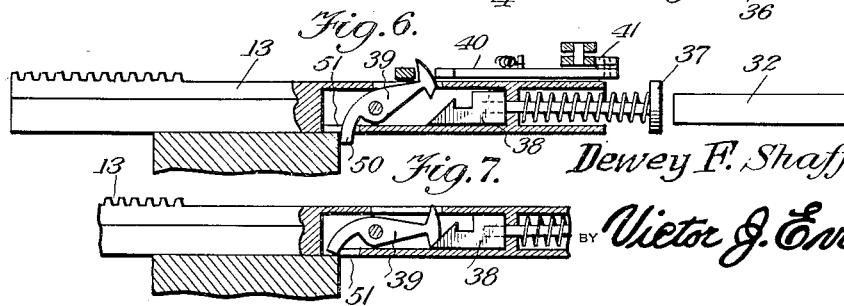
Dewey F. Shaffer
INVENTOR
BY Victor J. Evans
ATTORNEY Patented Dec. 23, 1924.

1,520,447

UNITED STATES PATENT OFFICE.

DEWEY F. SHAFFER, OF SINES, MARYLAND.

SPEED REGISTER.

Application filed November 2, 1923. Serial No. 672,381.

*To all whom it may concern:*

Be it known that I, DEWEY F. SHAFFER, a citizen of the United States, residing at Sines, in the State of Maryland, have invented new and useful Improvements in Speed Registers, of which the following is a specification.

This invention relates to a speed indicator for motor vehicles, the general object of the invention being to provide means for indicating the highest speed attained by a vehicle on a trip so that a check can be kept on the driver to see whether or not he has exceeded the speed limit.

Another object of the invention is to provide means for setting the parts so that they will not operate until a predetermined speed is reached.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a sectional view through the casing and showing the parts within the casing in elevation and in section.

Figure 3 is a section on line 3—3 of Figure 2.

Figure 6 is a sectional detail view showing the spring plunger and the rack bar which carries the same with the escapement operating dog in operative position.

Figure 7 is a similar view but with the dog in lowered position.

Figure 1:
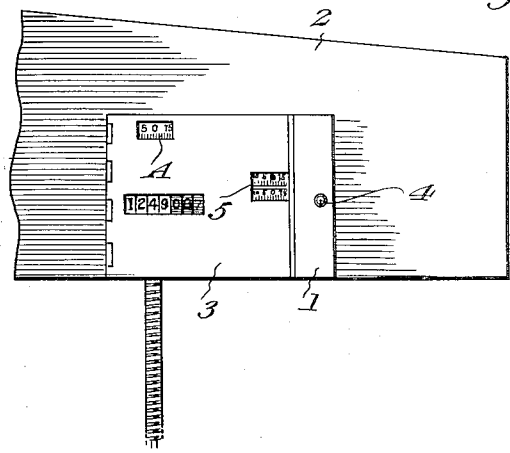
Figure 1 is a view showing the invention arranged upon the dash of a motor vehicle and associated with the speedometer of the motor vehicle.
Figure 8:
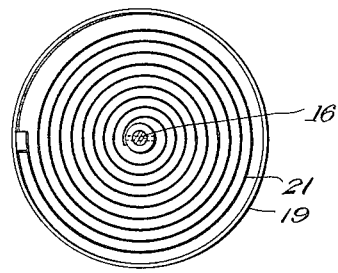
Figure 8 is a view showing the arrangement of the spring in one of the register wheels.
Figure 4:
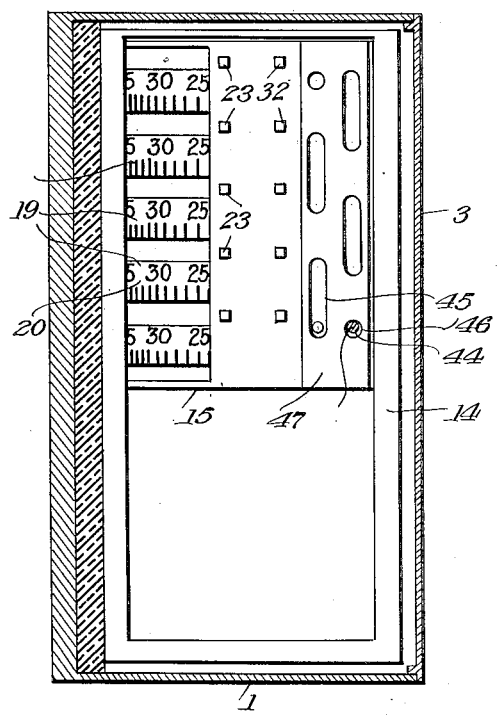
Figure 4 is a section on line 4—4 of Figure 3.
Figure 5:
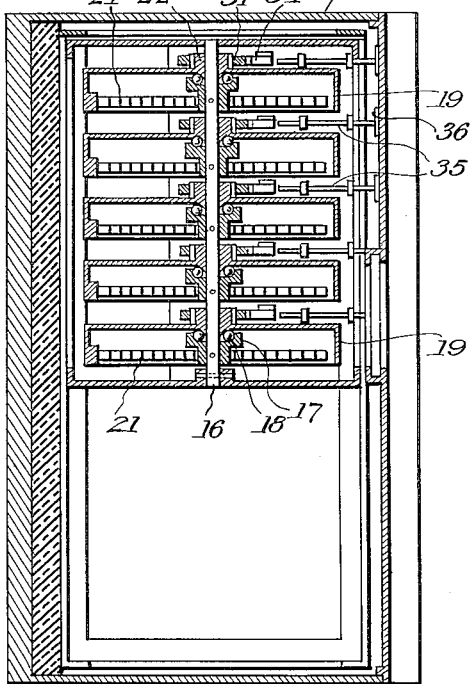
Figure 5 is a section on line 5—5 of Figure 3.

In these views, 1 indicates a casing which is designed to be placed on the dash 2 of a motor vehicle, the front of the casing being formed of a hinged door 3 which is provided with a suitable lock 4 and which is provided with a window 5, one of which is associated with the governor actuated speedometer, shown generally at A, and the other of which is associated with the improved indicator. The speedometer is of the usual type. A sleeve 6 is movably mounted on the shaft of the governor and this sleeve is provided with the annular ribs 7 which are engaged by the toothed segments 8 which are actuated by the governor weights 9 so that when the governor weights swing outwardly the members 8 will engage the ribs and thus move the sleeve upwardly. This movement of the sleeve will rock a shaft 10 by means of the pinion 11 thereon engaging the ribs of the sleeve and said shaft carries a toothed segment 12 which engages with a rack bar 13 so as to reciprocate the bar by the action of the governor of the speedometer. A frame 14 is placed in the casing and is insulated therefrom and a second frame 15 is slidably mounted in the frame 14. This frame 15 carries a shaft 16 to which is connected a plurality of cups 17, carrying the balls 18 for the register wheels 19. These wheels are of cup-shape and have the characters 20 upon their peripheries which are arranged to appear at the window 5. A spring 21 is arranged in each wheel and tends to hold the wheel in zero position. A pinion 22 is carried at the top of each wheel and these pinions are adapted to be engaged by the rack bars 23, each of which has one end arranged in a socket 24 of a frame 25 which has a rack 26 at its lower end which is adapted to be engaged by a pinion 27 on a spring pressed stem 28 which is provided with a handle 29, the spring 30 normally holding the pinion out of engagement with the rack. By pushing the stem inwardly to cause the pinion to engage the rack and then rotating the stem the frame 25 can be moved bodily and thus cause the rack bars 23 to rotate the pinions so as to set all the register wheels at any desired speed. For instance, if the speed limit is twenty miles the parts would be adjusted so that the characters 20 would appear at the window 5. Each pinion is engaged by the teeth 31 on a bar 32 which is also provided with the inclined teeth 33 which are adapted to be engaged by the dog 34, this dog acting to hold the parts in adjusted position. The dog can be released from the teeth so as to permit the springs to return the parts to normal position by means of the sliding rod 35 having its end bent to engage the dog and which is provided with a handle 36. Both the rod 35 and the stem 28 are covered by the door 3 when the same is closed so that the driver cannot tamper with the device after the parts have been set and the door locked. The rack bar 13 carries a spring plunger 37 which is adapted to engage the ends of the bar 32 when the speed of the vehicle reaches the speed for which the register wheels are set. As soon as the plunger strikes the bar 32 it will be forced inwardly until a notched wedge member 38 on the inner end of the plunger strikes a pivoted dog 39 carried by the rack bar 13 so that said dog 4 is forced upwardly until a part thereof engages the notch in the wedge member. As the speed of the vehicle exceeds that for which the register wheels are set the rack bar 13 continues to move towards the right and it thus pushes the bar 32 towards the right so that the register wheel is rotated by the engagement of the pinion 22 with the teeth 31 on the rack. This will cause the register wheel to revolve and thus indicate the highest speed attained by the vehicle. The parts will be held in this position by the dog 34 engaging the teeth 33. When the vehicle slackens its speed the rack bar 13 will move towards the left due to its connection with the governor actuated sleeve so that the dog 39 will engage one of a pair of pawls 40 which are pivoted to a lever 41 which has one end connected by the link 42 with the escapement lever 43 to which the escapement pins 44 are pivoted. These pins are arranged to engage the slots 45 and the holes 46 in a strip 47 which is carried by the frame 15 and which is insulated from the frame by the blocks 48 of insulating material. Thus on the rearward movement of the rack bar 13 the escapement mechanism will be actuated so that the frame 15 can drop to bring the second rack bar 32 opposite the plunger 37 of the rack bar 13 so that the next speed registering wheel will be actuated if the vehicle should again exceed the speed limit. In this way a plurality of indications will be made of the vehicle exceeding the speed limit in a single trip. As one of the pins 44 leaves the first hole 46 the other pin enters the first slot 45 and when the other pin is entirely free of the hole 46 the frame will drop until the second pin engages the top of the slot. This action is repeated in the other slots until the frame 15 is in its lowest position and all the speed registering wheels have been actuated. When the frame 15 is to be raised again to reset the device, a block 48', to which the escapement lever 43 is pivoted, is moved on its guide 49 to free both pins 44 from the strip 47 so that the frame can be raised without interference on the part of said pins. The dog 39 is provided with a rear extension 50 which is adapted to pass through a hole 51 in the rack bar and to engage a part of the supporting frame of the rack bar so that said dog will be moved out of engagement with the notch in the wedge 38 and will return to normal position under the action of gravity. An alarm 52 is arranged in the casing. Conductors 53 connect the alarm with a suitable source of supply and with the frame of the governor mechanism while a conductor 53' connects the source with the frame 14 which is insulated from the rest of the device. Thus as soon as the plunger 37 strikes the rack bar 32 the circuit will be completed to the alarm and the same sounded to notify the driver that he has reached the speed limit. If the speed increases the plunger will actuate the rack bar 32 so as to operate the register wheels to indicate that the vehicle has gone above the speed limit.

From the foregoing it will be seen that a number of indications of excessive speeds are made, for one trip if the vehicle should exceed the speed limit during the trip and that the parts can be adjusted to place them at any desired speed limit. The parts cannot be gotten at by the driver so that the owner of the vehicle can keep a check on the driver to see whether or not he exceeds the speed limit. The device will also be useful to prove in court whether or not the vehicle has traveled as fast as the policeman claims.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a plurality of speed indicating members, means for setting the same to indicate the desired speed limit, a plunger for actuating the members when a vehicle exceeds the speed for which the members are set, means for actuating the plunger from the speedometer of the vehicle and means actuated by the plunger for successively bringing the speed registering members into a position where they can be operated upon by the plunger.

2. An apparatus of the class described comprising a casing, a supporting frame therein, a frame slidably mounted in the supporting frame, a plurality of registering members carried by the sliding frame, means for setting the members to indicate the desired speed limit, a plunger, means actuated thereby for moving the members when the speed of the vehicle exceeds that for which the members are set and escapement mechanism operated by the plunger for permitting the frame to move in its supporting frame to successively bring the speed registering members into position to be operated by the plunger and means for actuating the plunger from the speedometer of the vehicle.

3. In a motor vehicle, a casing containing the speedometer of the vehicle, a plunger actuated by the speedometer, a supporting frame located in the casing and insulated therefrom, a frame slidably mounted in the supporting frame, a shaft in said sliding frame, a plurality of speed indicating wheels carried by the shaft, a gear connected with each wheel, a rack engaging each gear, a frame for movably supporting each rack, setting means for the frame, a second rack engaging each gear, ratchet means for holding the second rack in adjusted position, releasing means for the ratchet means, said second rack being engaged by the plunger when the speed of the vehicle exceeds that for which the wheels are set and escapement mechanism actuated by the plunger for permitting the movable frame to move downwardly step by step to bring the succeeding racks in succession to a position where they will be actuated by the plunger.

In testimony whereof I affix my signature.

DEWEY F. SHAFFER.